United States Patent [19]
Niedrach et al.

[11] 3,911,901
[45] Oct. 14, 1975

[54] IN VIVO HYDROGEN ION SENSOR

[75] Inventors: Leonard W. Niedrach; Oliver H. Leblanc, Jr., both of Schenectady, N.Y.

[73] Assignee: General Electric Company, Schenectady, N.Y.

[22] Filed: July 24, 1974

[21] Appl. No.: 491,771

[52] U.S. Cl. .............................. 128/2 E; 204/195 R
[51] Int. Cl.² ......................................... G01N 27/46
[58] Field of Search .......... 128/2 E, 2.1 E; 204/195, 204/1 T

[56] References Cited
UNITED STATES PATENTS

| | | | |
|---|---|---|---|
| 3,224,436 | 12/1965 | Massena | 204/1 T X |
| 3,448,032 | 6/1969 | Settzo et al. | 204/195 L |
| 3,467,591 | 9/1969 | Frant | 204/195 R |
| 3,530,849 | 9/1970 | Watanabe et al. | 128/2 |
| 3,582,474 | 6/1971 | Hair et al. | 204/1 T |
| 3,671,414 | 6/1972 | Grubb | 204/195 R |
| 3,709,810 | 1/1973 | Grubb et al. | 204/195 R |
| 3,729,401 | 4/1973 | Cosgrove et al. | 204/195 L |

*Primary Examiner*—G. L. Kaplan
*Attorney, Agent, or Firm*—Jane M. Binkowski; Joseph T. Cohen; Jerome C. Squillaro

[57] ABSTRACT

An in vivo specific ion sensor contains a specific ion electrode and a spaced apart, adjacent reference half cell which has its immobilized electrolyte adjacent to and spaced from the specific ion electrode. The specific ion sensor is introduced, for example, into the blood stream by passing it through a cannula which perforates the subject's tissue and the underlying wall of the blood vessel.

4 Claims, 1 Drawing Figure

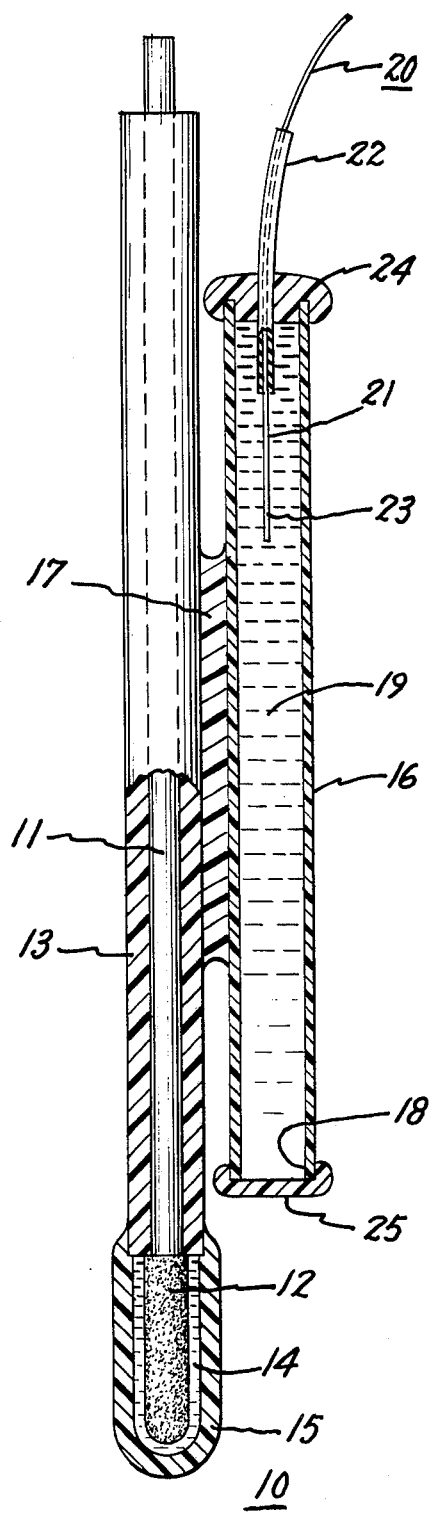

IN VIVO HYDROGEN ION SENSOR

This invention relates to a specific ion sensor and, more particularly, to an ion specific sensor for in vivo application.

Sensors are employed to determine the content of a specific substance in a fluid or atmosphere. For example, a sensor might be employed to determine the hydrogen ion activity or pH, the oxygen content or carbon dioxide content in a sample.

For in vitro applications, specific ion sensors are known in the prior art for measuring the hydrogen ion activity of pH of a sample. Such a sensor employs a reference electrode and a sensing electrode, such as a glass electrode immersed in a solution, whereby the potential difference between the two electrodes is a function of the concentration of the hydrogen ion in the solution. The salt bridge reference electrode is the most useful. This contains an electrochemically active metallic element in contact with an intermediate, or bridge, salt solution, which separates the metallic element from the sample solution to be measured. Electrical connection between the salt bridge solution and the sample solution is made generally by a liquid contact through an aperture referred to as a liquid junction. Such sensors which are made of glass employ separate spaced apart reference electrodes and sensing electrodes or employ a glass sensing electrode surrounded by a reference electrode making a suitable junction with the solution being examined.

In U.S. Pat. No. 3,709,810 there is described and claimed a hydrogen ion selective sensor for particular application as an in vivo sensor. This sensor, which does not employ glass electrodes, has a hydrogen ion selective electrode at one end of an elongated insulating wire which is surrounded by a chamber containing a reference electrode and a reference electrolyte. A wick is provided from the interior of the reference electrolyte chamber to the exterior surface of the sensor to provide an electrolyte bridge. In U.S. Pat. No. 3,705,089 there is described and claimed a reference electrode half cell. This half cell includes an elongated tube of electrically insulating material containing a reference electrode and a gelled reference electrolyte. Both of these patents are assigned to the same assignee as the present application.

Our present invention is directed to an improved miniaturized specific ion sensor for in vivo application. As opposed to the above first mentioned prior art, the subject invention eliminates glass electrodes and provides a miniature structure for in vivo application. As opposed to the prior art disclosed in the above-mentioned patents, the present application provides an improved sensor with an immobilized electrolyte which eliminates the wick arrangement described in the first of the above two patents, and provides a reference half cell spaced apart but adjacent to the specific ion electrode. As opposed to the second above described patent, the present invention is directed to a sensor rather than to a reference electrode half cell.

The primary objects of our invention are to provide a rugged, accurate and miniaturized sensor for in vivo applications.

In accordance with one aspect of our invention, an in vivo specific ion sensor contains a specific ion electrode, and a spaced apart, adjacent reference half cell which has its immobilized electrolyte adjacent to and spaced from the specific ion electrode.

These and various other objects, features and advantages of the invention will be better understood from the following description taken in connection with the accompanying drawing in which:

The single FIGURE is a sectional view of an in vivo specific ion sensor made in accordance with our invention.

In the single FIGURE of the drawing, there is shown generally at 10 an in vivo specific ion sensor made in accordance with our invention. Sensor 10 is shown in the form of a flexible metallic elongated electrode lead 11 which is electronically conducting and has an electro-chemically active portion 12 at one end thereof. Electrical insulation 13 surrounds and adheres to electrode lead 11. An immobilized electrolyte 14 coats electrochemically active portion 12. A membrane barrier 15 selectively permeable to a particular ionic species encapsulates electrolyte 14 and electrochemically active portion 12 and overlaps and bonds to insulation 13. Portion 12, electrolyte 14 and membrane barrier 15 forms an electrochemically active region at the end of lead 11. Electrolyte 14 contains at least an ion that enters into electrochemical equilibrium with electrochemically active portion 12, as well as the ion to which membrane barrier 14 is selectively permeable. A tube 16 which is electrically insulating, is spaced from and adjacent to at least a portion of electrode lead 11 and its associated insulation 13. Tube 16 is affixed to insulation 13 by a suitable means such as by an epoxy resin 17. One end 18 of tube 16 must be adjacent to and spaced from barrier 15. An immobilized aqueous electrolyte 19 is contained within tube 16. A metallic element 20 partially within tube 16 comprises a metallic electrode lead 21 partially coated with insulation 22 and on which at least a portion thereof there is an electrochemically active region 23 that can enter into electrochemical equilibrium with an ion in electrolyte 19. Electrode lead 22 extends externally of tube 16 through a seal 24 closing the opposite end of tube 16. An ion-permeable membrane barrier 25 is shown closing end 18 of tube 16. The purpose of this membrane barrier 25 is to impede the transport of living cells, or of protein molecules, into electrolyte 19 when the sensor is immersed in a solution, such as blood, which contains such cells and molecules. At the same time it must permit ready transport of small electrolyte ions. Therefore, the membrane serves a function similar to that of membranes commonly used for dialysis and can therefore be constructed of materials used for dialysis membranes, such as cellulose acetate, for example. Such a membrane barrier 25 is not critical.

The specific ion electrode of the above in vivo sensor can be formed by a method of applying layers or elements by dipping or immersing the initial electrode lead in different solutions after which the solution solvent may be evaporated. The application of layers is preferably accomplished by immersion steps but other suitable means include coating, spraying, brushing, etc. The use of immersion steps is described and claimed in U.S. Pat. No. 3,798,750.

Our in vivo sensor can be formed by employing a flexible, metallic elongated electrode lead. In the embodiment as shown in the drawing and as described above, an electrochemically active portion of, for example, silver coated with a silver chloride is present at one end of the lead. The remaining portion of the lead except for the electrochemically active portion and for a short length at the opposite end is insulated with suitable electrical insulation, for example, epoxy resins, polymides, polyethers, poly(tetrafluoroethylene), silicone rubber or poly(dimethylsiloxane) poly(bisphenol-A carbonate) block copolymers, or multiple coats of such insulations in order to provide improved bonding, for example, by a first coat of poly(tetrafluoroethylene) followed by a second coat of a poly(dimethylsiloxane) poly(bisphenol-A carbonate) block copolymer.

The electrochemically active portion is coated with a layer of an immobilized aqueous electrolyte containing at least the ion which is to be detected and also an ion which enters into electrochemical equilibrium with the electrochemical active region of the lead, such as a chloride ion. The layer of immobilized electrolyte can be applied by dipping the end of the lead into a volume of such electrolyte. Then, over the layer of this immobilized electrolyte a polymer membrane selectively permeable to the ion to be sensed is applied, for example, by dipping the lead into a solution containing the polymer. The solvent of the latter solution is then evaporated to leave a film of the selectively permeable polymer covering the immobilized electrolyte and the electrochemically active region of the lead. The resulting structure is the ion-specific electrode of the sensor. The selectively permeable, polymer membrane barrier can, for example, be selectively permeable to hydrogen, potassium or calcium ions. The immobilized electrolyte must contain the ion to which the membrane is selectively permeable, and the ion which enters into electrochemical equilibrium with the active region of the metallic lead. For example, if the electrochemically active region of the lead is silver and silver chloride and if the polymer membrane is selectively permeable to hydrogen ions, then a suitable immobilized electrolyte contains sodium chloride and a suitable hydrogen ion buffering electrolyte such as disodiumhydrogen phosphate and potassiumdihydrogen phosphate and, a suitable gelling agent, such as 2% or 3% Methocel gel, a methylcellulose material sold by Dow Chemical Company, Midland, Michigan. Polymers selectively permeable to hydrogen ions are described and claimed in U.S. Pat. No. 3,743,588. Polymers selectively permeable to potassium ions are described and claimed in U.S. Pat. No. 3,767,553. Both of these patents are assigned to the same assignee as the present application. Both of these patents and the subject matter thereof are hereby incorporated by reference.

The tube which is spaced from and adjacent at least a portion of the electrode lead is an electrical insulator. The tube can be made from a variety of materials with various plastics being preferred. One end of the tube must be adjacent to and spaced from the active region of the electrode lead. The tube is affixed to a portion of insulation by cementing with an epoxy resin. A metallic element, which comprises a metallic electrode lead and an electrochemically active region of silver and silver halide on at least a portion thereof is positioned in the tube in a variety of manners. The metallic element of the reference electrode extends outwardly from the tube for connection to an appropriate electrical circuit. An immobilized aqueous electrolyte is contained within the tube and is in contact with the active portion of the metallic element of the reference electrode. A suitable electrolyte is 0.15 molar sodium chloride which is immobilized with a conventional thickening or gelling agent, such as 2% agar-agar.

At the opposite end of the tube, the electrode lead with adhering insulation extends outwardly. A seal closes this end of the tube. Such a seal can be made of a variety of materials. An epoxy resin cement is a suitable seal material. Optionally, an ion-permeable membrane barrier can close the opposite end of the tube adjacent the active region. Such a barrier can be made, for example, of cellulose acetate. A high impedance electrometer is connected to the electrode leads of the sensor. The terminal voltage is read between the metallic lead of the ion specific electrode and the metallic lead of the reference electrode. The terminal voltage from this sensor in operation will be a function of the pH. The sensor is introduced into the blood stream of a patient by passing it through a cannula which perforates the subject's tissue and the underlying wall of a blood vessel. When the sensor is in the blood stream, the specific ion active region and the open end of the tube are in communication with the blood. In this manner, the immobilized electrolyte within the tube forms an electrolytic bridge between the blood and the electrochemically active portion of the metallic element of the reference electrode.

An example of an in vivo sensor made in accordance with our invention is as follows:

An in vivo pH sensor was formed in the following manner. A first flexible metallic elongated electrode was provided in the form of a 0.015 inch diameter silver wire insulated with a first layer of poly(tetrafluorethylene) and a second layer of poly(siloxane) poly(bisphenol-A carbonate) block copolymer, except for a short, 1 cm length at either end. A layer of silver chloride was applied to the uninsulated silver at one end of the lead by electrolytic annodization for 5 minutes at 0.6 milliamperes current in 0.1 molar sodium chloride. A thin layer of an immobilized electrolyte was then applied over the silver chloride by dipping the end of the lead in a large volume of the electrolyte, then rapidly removing it. The composition of this immobilized electrolyte was as follows: 0.080 molal disodiumhydrogenphosphate, 0.083 molar potassiumdihydrogenphosphate, and 3 weight percent methylcellulose, all dissolved in water. A sheath of a polymer selectively permeable to $H^+$ ions was then applied over the immobilized electrolyte layer, and overlapped a portion of the insulation of the elongated silver lead, by dipping into a solution of this polymer formulation in methylene chloride, then removing the methylene chloride solvent by drying for 1 minute in dry nitrogen gas, then drying for 10 minutes more in air. The polymer selectively permeable to $H^+$ ions was of the type described and claimed in U.S. Pat. No. 3,743,588 referred to above. This completed the fabrication of the pH-sensitive element of the sensor.

The fabrication of the whole sensor was completed by incorporating the pH-sensitive element into a structure with a reference electrode as shown generally in the single FIGURE. A poly(tetrafluoroethylene) tube was affixed to a portion of the insulated electrode. One end of the tube was positioned adjacent to and spaced from the membrane barrier. The lumen of the poly(tetrafluoroethylene) tube was then filled with an immobilized aqueous electrolyte solution by injecting this solution through the other end of the tubing by means of a hypodermic syringe. The composition of this immobilized electrolyte solution was as follows: 0.113 molar disodiumhydrogenphosphate, 0.005 molar potassiumdihydrogenphosphate, and 2 percent by weight agar-agar. Next the free end of the poly(tetrafluoroethylene) tube was crimped by means of a hot tool. A partially insulated silver wire with a silver chloride portion had its silver chloride portion positioned within the lumen of the tube through the remaining partial opening in the tube. The same end of the tube was then sealed with epoxy resin. This completed the fabrication of a complete pH sensor.

While other modifications of the invention and variations thereof which may be embraced within the scope of the invention have not been described, the invention is intended to include such as may be embraced within the following claims.

What we claim as new and desire to secure by Letters Patent of the United States is:

1. An in vivo specific ion sensor which comprises a flexible metallic elongated electrode lead, an electrochemically active portion coating one end portion of said elongated electrode lead, an immobilized aqueous electrolyte coating the electrochemically active portion, said immobilized aqueous electrolyte containing at least two ions, one of said ions being the same as the ion to be detected and the second of said ions being one which enters into electrochemical equilibrium with the electrochemically active portion of said elongated electrode lead, a membrane barrier selectively permeable to the ionic species to be detected encapsulating the electrochemically active portion and the electrolyte coating, electrical insulation surrounding and adhering to said elongated electrode lead except for said electrochemically active portion coating one end portion of said lead and the opposite end portion of said lead, a tube having an opening at each end substantially in juxtaposition with said flexible elongated electrode lead and electrically insulated therefrom, the tube affixed to at least a portion of said electrical insulation, an ion-permeable membrane covering the opening at one end of the tube adjacent to and spaced from said encapsulating membrane barrier, an immobilized aqueous electrolyte contained within the tube, a metallic reference electrode element partially within the tube comprising a metallic electrode lead and an electrochemically active region, said electrochemically active region of the metallic reference electrode element being in contact with the electrolyte, a seal closing the opening at the opposite end of the tube, and a portion of the metallic reference electrode element forming a lead extending externally of the tube through said seal.

2. An in vivo sensor as in claim 1, in which said electrochemically active portion is responsive to hydrogen ions.

3. An in vivo sensor as in claim 1, in which said electrochemically active portion is responsive to potassium ions.

4. An in vivo sensor as in claim 1, in which said electrochemically active portion is responsive to calcium ions.

* * * * *